United States Patent [19]

De Cuadros

[11] Patent Number: 4,985,267

[45] Date of Patent: Jan. 15, 1991

[54] METHOD OF PRODUCING DRIED FOOD

[76] Inventor: Graciela De Cuadros, 836 Y Rumichaca, 4 to Piso, (Ultima Escalera), Guayaquil, Ecuador

[21] Appl. No.: 521,034

[22] Filed: May 9, 1990

[51] Int. Cl.$^5$ ............................................. A23L 1/00
[52] U.S. Cl. .................................... 426/473; 426/523
[58] Field of Search ............... 426/646, 465, 473, 489, 426/518, 523

[56] References Cited

U.S. PATENT DOCUMENTS 3,378,380  4/1968  Yamamoto et al. ................ 426/473
4,259,361  3/1981  Procter ............................... 426/473

*Primary Examiner*—George Yeung
*Attorney, Agent, or Firm*—Oblon, Spivak, McClelland, Maier & Neustadt

[57] ABSTRACT

A method of producing dried food including the steps of (a) cooking food to be dried at approximately 100° F. for approximately 30 minutes; then (b) grinding the cooked food into chunks; then (c) cooking the chunks at approximately 100° F. for approximately 24 hours, thereby drying the food; then (d) reducing the dried chunks to fine power; and then (e) cooking the dried powder at approximately 80° F. for approximately 12 hours.

13 Claims, No Drawings

METHOD OF PRODUCING DRIED FOOD

FIELD OF THE INVENTION

This invention relates to methods of producing dried foods. It is particularly useful for producing dried foods that can be stored for long times or transported great distances without refrigeration and without deterioration.

BACKGROUND OF THE INVENTION

My invention relates to the use of slow heat for obtaining dry powdered and whole instant and semi-instant foods from all agricultural and livestock resources and especially from the resources of the sea for modern, positive, nutritious food befitting the passage of time and the distances which for many people working in factories, offices, schools, etc. make it very difficult for them to feed themselves in accordance with the requirements of their bodies. The motto for this method is "feed yourself more by eating less." It is not a chemical method. It is a natural method, since our bodies are also subject to the laws of nature, and this is what humanity requires. Accordingly, my natural pure food method produces food without removing or adding additives or preservatives in food or drink. Instead, my slow heat method produces long lasting foods which can easily be sent to distant places such as Africa, India, etc., where annually thousands of people die of hunger and malnutrition. Moreover, my method permits the use of easy and economical packaging, since it does not require refrigeration or expensive containers. Thus, the food produced by my method is produced by a modern food transformation.

Humanity is awaiting a response to the dilemma of obtaining such foods. Despite the fact that we have fresh foods available, no fresh foods are available for many people who work during the time needed to prepare them and at times needed to eat them. For example, a cooked beet, although it contains nutrients for certain organisms, is not easy to eat whole. However, when it is reduced to powder with its odor, color, and natural flavor intact, it is very easy to take two spoonfuls and put them in milk, soup, purée, etc. in a single dish. Likewise with carrots. The same thing may be said of chicken, turkey, fish, liver, etc. These proteins reduced to natural powder in large measure solve the problem of malnutrition. In spite of our being able to eat a thick steak, cooked stews, etc., occasionally there is no time to buy such food, clean it, cook it, etc. This is particularly true of a person who comes in tired and does not take the time to cook such food for himself or his family, or individuals suffering from accidents or any serious condition preventing them from taking food. My powdered food is a solution to such problems, since one or two teaspoonful of powdered meat or liver protein, etc., dissolved in liquid may save an anemic or undernourished person who may have lost blood.

Using my method, a farmer will be able uninterruptedly to turn over part of his products to banks for cassava, sweet potatoes, apples, tomatoes, etc. to be processed according to my method into dried powder having the vitamins and natural minerals of the original food intact. In this way, fewer farmlands will be tilled with their products set aside for this purpose—poultry farms especially. Moreover, for this purpose the fishing industry will have a new way to preserve its products for years.

DETAILED DESCRIPTION OF THE PRESENTLY PREFERRED EMBODIMENT

The following is a non-limiting example of my method as applied to the processing of meat.

If my method is applied to meat, it must be washed first with the skin and fat removed. It is then placed in a cooking pot at between approximately 90° F. and approximately 110° F, preferably approximately 100° F, for approximately 30 minutes. Then it is removed from the cooking pot and ground into chunks using disks containing holes. It is then placed on platters in an oven for approximately 24 hours at between approximately 90° F. and approximately 110° F, preferably approximately 100° F. When it is quite dry, it is reduced to fine powder and then returned to the oven for approximately 12 hours at between approximately 70° F. and approximately 90° F, preferably approximately 80° F. It is then ready to be processed with other food products.

It should be readily appreciated that my method can be used for other meats (such as poultry, liver, etc.), fruits, and vegetables.

CAVEAT

Obviously, numerous modifications and variations of the present invention are possible in light of the above teachings. It is therefore to be understood that, within the scope of the appended claims, the invention may be practiced otherwise than as specifically described herein.

I claim:

1. A method of producing dried food, said method comprising the steps of:
   (a) cooking food to be dried at between approximately 90° F. and approximately 110° F. for approximately 30 minutes; then
   (b) grinding the cooked food into chunks; then
   (c) cooking the chunks at between approximately 90° F. and approximately 110° F. for approximately 24 hours, thereby drying the food; then
   (d) reducing the dried chunks to fine powder; and then
   (e) cooking the dried powder at between approximately 70° F. and approximately 90° F. for approximately 12 hours.

2. A method as recited in claim 1 wherein:
   (a) the food to be dried is meat and
   (b) the method comprises the additional step of washing the meat with all its skin and fat removed prior to step (a) in claim 1.

3. A method as recited in claim 1 and comprising the additional step of mixing the dried powder with another food item after step (e) in claim 1.

4. A method as recited in claim 3 wherein the other food item is selected from the group consisting of milk, soup, and puree.

5. A method as recited in claim 1 wherein the food to be dried is vegetable.

6. A method as recited in claim 1 wherein the food to be dried is fruit.

7. A method as recited in claim 1 wherein the food to be dried is fish.

8. A method as recited in claim 1 wherein step (a) is carried out at approximately 100° F.

9. A method as recited in claim 8 wherein step (c) is carried out at approximately 100° F.

10. A method as recited in claim 9 wherein step (e) is carried out at approximately 80° F.

11. A method as recited in claim 1 wherein step (c) is carried out at approximately 100° F.

12. A method as recited in claim 11 wherein step (e) is carried out at approximately 80° F.

13. A method as recited in claim 1 wherein step (e) is carried out at approximately 80° F.

* * * * *